United States Patent [19]
Miller

[11] 3,826,134
[45] July 30, 1974

[54] ROTARY FLOW METER FOR WELLS

[76] Inventor: Leonidas C. Miller, 1321 Sombrero Dr., Monterey Park, Calif. 91754

[22] Filed: Aug. 9, 1971

[21] Appl. No.: 169,944

[52] U.S. Cl. .............................................. 73/155
[51] Int. Cl. ............................................ E21b 47/10
[58] Field of Search ...... 73/155, 229; 346/13, 33 W

[56] References Cited
UNITED STATES PATENTS

| | | | |
|---|---|---|---|
| 2,593,285 | 4/1952 | Fay et al. | 73/155 |
| 2,651,370 | 9/1953 | Pearson | 73/155 X |
| 2,713,261 | 7/1955 | Butterworth et al. | 73/155 |
| 3,286,521 | 11/1966 | Stout, Jr. | 73/189 |
| 3,379,059 | 4/1968 | Wiley | 73/155 |

*Primary Examiner*—Jerry W. Myracle
*Attorney, Agent, or Firm*—Lyon & Lyon

[57] ABSTRACT

A flow meter for measuring rate and direction of fluid flow at different elevations in a well employs a housing lowered into the well on a wire line. A vaned rotor carried by the housing is contacted and caused to rotate by well fluid moving longitudinally in the well. A sealed chamber within the housing contains a speed reducer, a revolution counter or stepper and a recorder. The sealed chamber prevents well pressure from contacting these devices. One wall of the sealed chamber is formed as a hollow hemispherical dome of non-magnetic material, and a magnetic coupling operates across the dome to connect the rotor shaft to the input shaft of the speed reducer. In one form of the invention, the revolution counter or stepper turns the recorder drive shaft intermittently through a small arc and then returns it to its initial position. In another form of the invention, the recorder drive shaft is driven intermittently by the revolution counter through a small arc of travel but is not returned after each impulse to its initial position.

7 Claims, 15 Drawing Figures

PATENTED JUL 30 1974
3,826,134
SHEET 1 OF 3
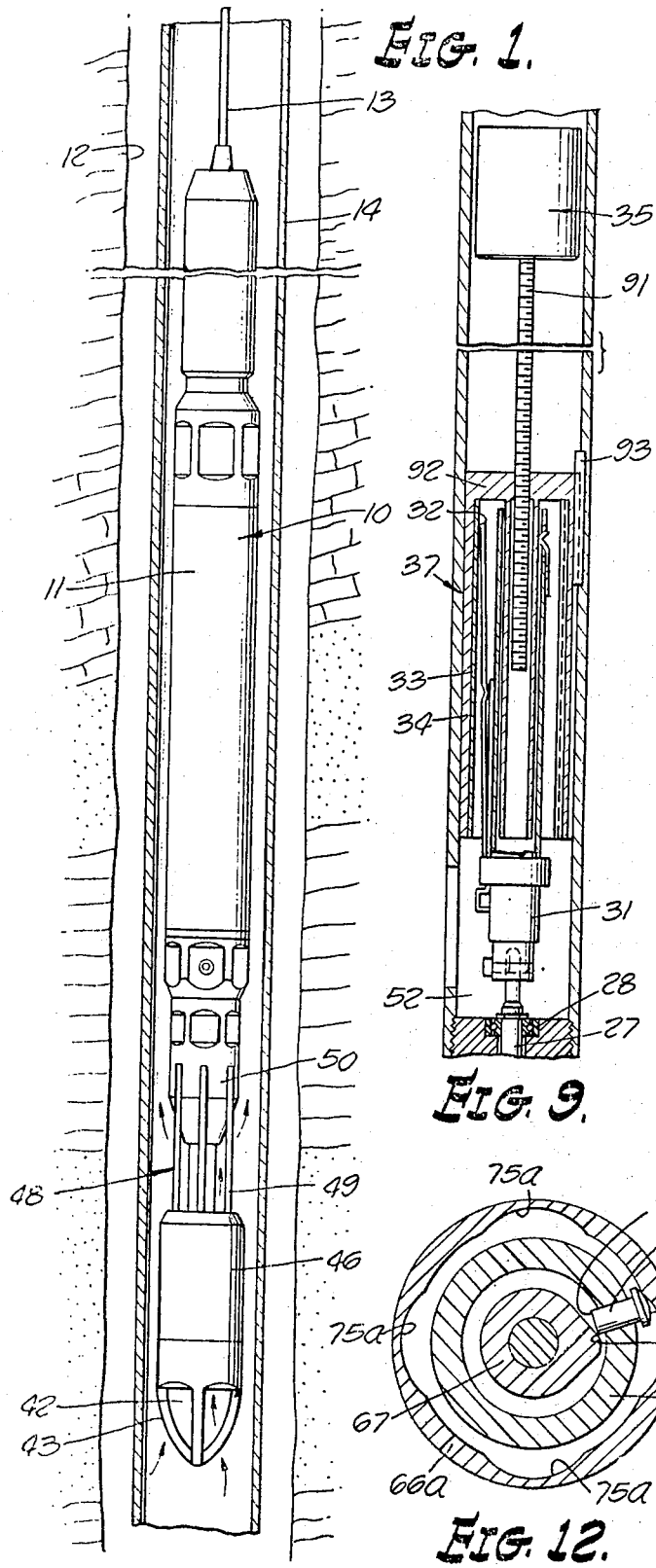
FIG. 1.
FIG. 9.
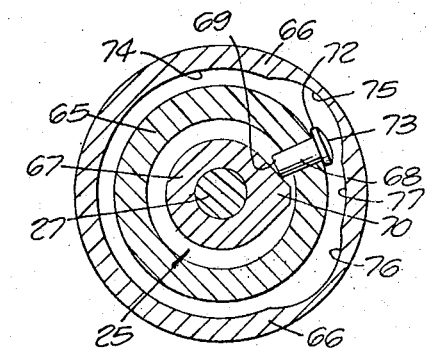
FIG. 3.
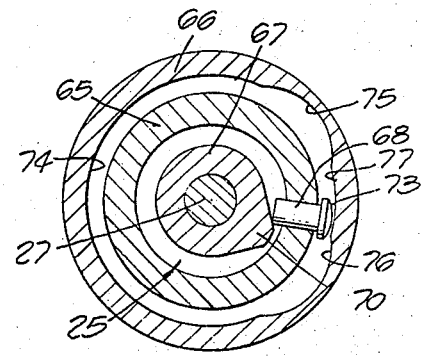
FIG. 4.
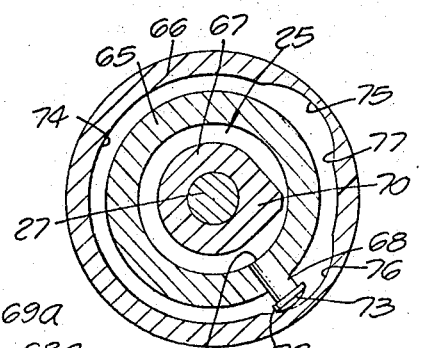
FIG. 5.
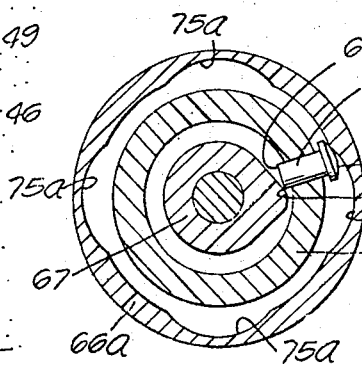
FIG. 12.

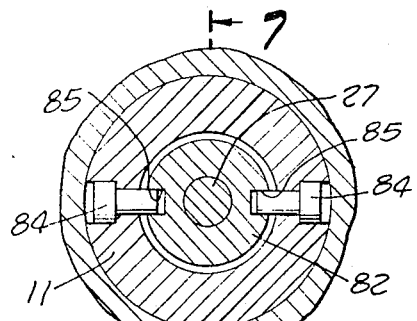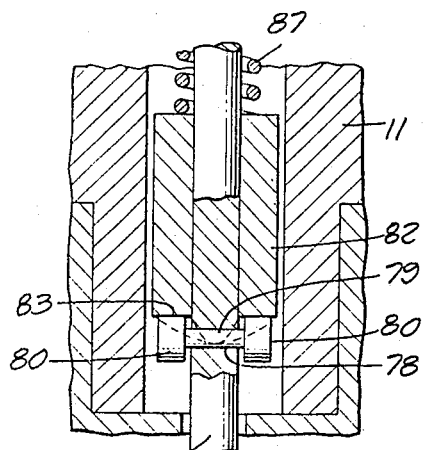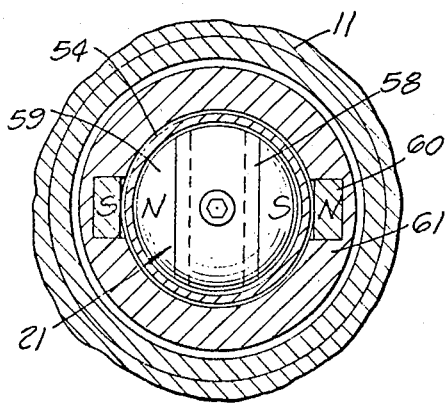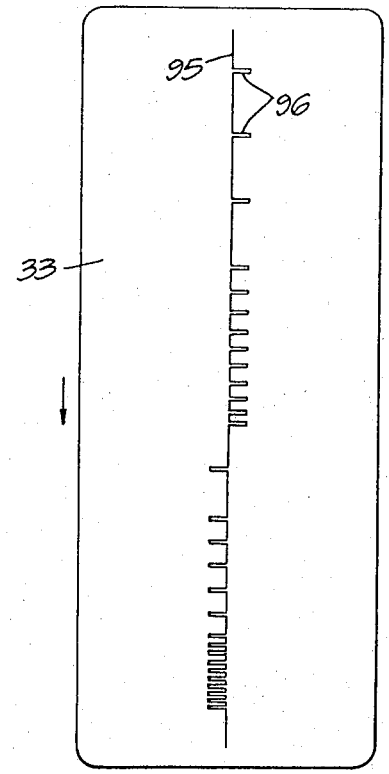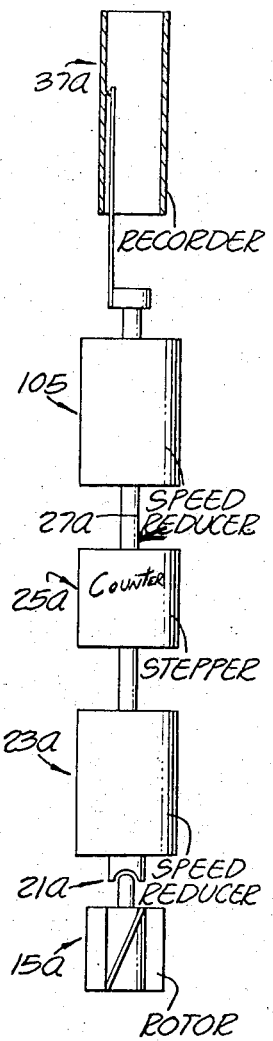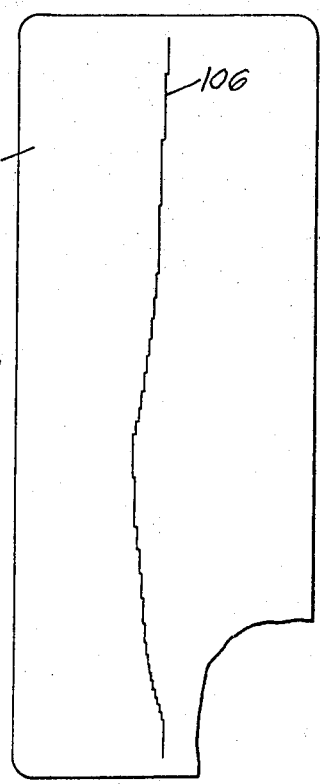

ROTARY FLOW METER FOR WELLS

This invention relates to a flow meter for wells, and its purpose is to measure and record the direction and flow rate of well fluid at various elevations within the well. Well formations traversed by a well bore may result in flow of well fluid within the well bore from one formation to another. Also, faulty cementing of a well casing may produce leaks which result in flow of well fluid from one formation into another. Also, leakage in a sectional well tubing may result in flow of well fluid into and out of the tubing at various elevations along its length. The device of the present invention which may be lowered into the well on a wire line enables the flow rate and direction of well fluid to be determined and recorded for various elevations within the well. In general terms, the device includes a housing which supports a vaned rotor for rotation by flow of well fluid. The housing has a sealed chamber containing a speed reducer, revolution counter or stepper, and recording chart device. The sealed chamber prevents damage to the devices within the chamber which would occur if well fluid were to enter the chamber under the high pressures which may be encountered. A novel form of magnetic coupling operates through a domed wall of the chamber to enable the rotor shaft which is outside the chamber to drive the speed reducer and other devices which are within the chamber.

Other and more detailed objects and advantages will appear hereinafter

In the drawings:

FIG. 1 is a side elevation showing a preferred embodiment of this invention in operative position within a well.

FIG. 2a is a sectional elevation of the device shown in FIG. 1.

FIG. 2b is a continuation of the lower end of FIG. 2a.

FIG. 2c is a continuation of the lower end of FIG. 2b.

FIG. 3 is a transverse sectional view taken substantially on the lines 3—3 as shown in FIG. 2a.

FIG. 4 is a view similar to FIG. 3, with the parts in a different position.

FIG. 5 is a view similar to FIG. 4, with the parts in a different position.

FIG. 6 is a transverse sectional view taken substantially on the lines 6—6 as shown in FIG. 2a.

FIG. 7 is a sectional elevation taken substantially on the lines 7—7 as shown in FIG. 6.

FIG. 8 is a transverse sectional view taken substantially on the lines 8—8 as shown in FIG. 2b.

FIG. 9 is a sectional elevation showing a portion of the upper end of FIG. 2a.

FIG. 10 is a plan view of a chart after removal from the recording device of the flow meter.

FIG. 11 is a schematic diagram showing a modified form of this invention.

FIG. 12 is a transverse sectional view showing operation of the parts of the rotation counter or stepper employed in this modified form of the invention.

FIG. 13 is a plan view of a recording chart after removal from the recorder shown in FIG. 11.

Figures 2A, 2B, 2C:
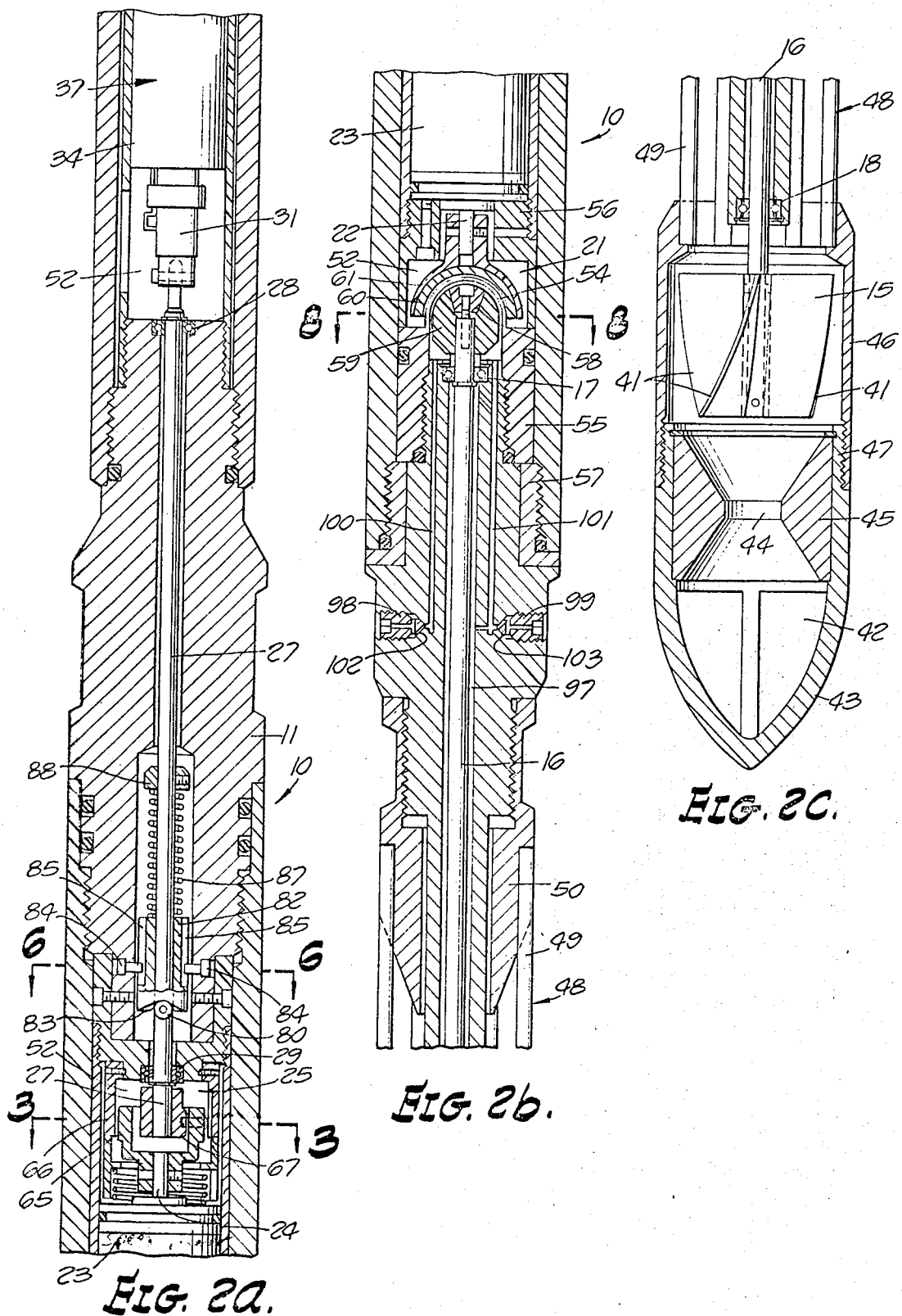

Referring to the drawings, the flow meter generally designated 10 includes a housing 11 adapted to be lowered into a well 12 on a wire line 13. Ordinarily, the device 10 is lowered through the interior of a sectional well tubing 14. A vaned rotor 15 is fixed on a rotary shaft member 16 mounted in axially spaced bearings 17 and 18 to rotate about the longitudinal axis of the housing 11. A magnetic coupling device generally designated 21 connects the upper end of the rotary shaft member 16 to the high speed input shaft 22 of a conventional gear driven speed reduction unit 23. The low speed output shaft 24 of the speed reduction unit 23 drives a revolution counter or stepper generally designated 25. For each revolution of the speed reduction unit output shaft 24, the drive shaft 27 is turned through a small arc and then back to its initial position. The shaft 27 is coaxial with the shaft 16 and is rotatably supported in axially spaced bearings 28 and 29. Angular turning movement of the shaft 27 turns the stylus carrier 31 and causes the stylus 32 to mark the surface of a chart 33 mounted in a chart carrier 34. The chart carrier 34 is driven in an axial direction by means of a clockwork mechanism 35. The stylus carrier 31, stylus 32, chart 33, chart carrier 34, clockwork mechanism 35, and associated parts are of conventional design and are referred to hereinafter as the recorder 37.

The rotor 15 is provided with blades or vanes 41 which are directly contacted by fluid moving longitudinally in the well. If such fluid is moving in an upward direction, it flows inward through the ports 42 within the tapered nose piece 43, and through the circular opening 44 in the ring 45 carried within the nose piece 43. The guard 46 which encircles the rotor 41 supports the nose piece 43 by means of threads 47, and this guard 46 is supported by the apertured connection generally designated 48 from the lower end of the housing 11. The apertured connection 48 preferably takes the form of a circumferential series of parallel axial rods 49 fixed at their upper ends to the housing part 50 and fixed at their lower ends to the guard 46. Well fluid passing upward around the vaned rotor 15 passes outward through the spaces between the parallel rods 49.

The housing 11 is made up of a number of parts connected end-to-end, and certain of these parts cooperate to form a sealed chamber 52 within the interior of the housing. Within this sealed chamber 52 are mounted the recorder 37, revolution counter 25, and the speed reducer 23. The interior of this sealed chamber is isolated from the well fluid and from the pressure thereof. In a deep well the pressure of the well fluid may exceed 10,000 psi, and it is important that well fluid under such high pressure be excluded from the sealed chamber 52. Accordingly, the bottom wall of the chamber is formed as a hollow hemispherical dome 54 projecting into the chamber 52. This dome 54 is formed integrally with the body ring 55 which forms a part of the housing 11 and which is clamped between the threaded members 56 and 57. The magnetic coupling device 21 makes it possible to drive the stub shaft 22, which is within the chamber 52, from the rotary shaft member 16 which is outside the chamber 52. A convex magnet 58 is mounted on the carrier 59 fixed to the upper end of the rotary shaft member 16. The magnet 58 has close running clearance with the inner surface of the dome 54. A concave magnet 60 is mounted on a carrier 61 fixed to the stub shaft 22 of the speed reducer 23. The magnet 60 has close running clearance with the outer surface of the hollow dome 54. The dome 54 is formed of non-magnetic material, so that rotation of the convex magnet 58 causes rotation of the concave magnet 60 at a 1:1 speed ratio.

Rotation of the stub shaft 22 causes the speed reducer 23 to drive the output shaft 24 at a much lower speed. For example, the speed reduction may be on the order of 100:1.

The revolution counter or stepper generally designated 25 includes a driving part 65 which turns in the annular space between the stationary shell 66 and the driven element 67 fixed to the shaft 27. A radially extending pin 68 is mounted for radial sliding movement on the driving part 65 and has an inner end 69 adapted for sliding engagement with the cam nose portion 70 of the member 67. The pin 68 has an enlarged head 72 with a rounded outer surface 73 adapted for sliding contact with the inner wall surfaces 74 and 77 and recesses 75 and 76 on the stationary shell 66.

Resilient means are provided for resisting rotation of the shaft 27, and as shown in FIGS. 2a and 7 of the drawings a transverse bore 78 is formed in the shaft 27 for reception of a rotary axle 79 carrying integral rollers 80 at its opposite ends. A collar 82 is slidably mounted on the shaft 27 and has a cam surface on its lower face 83 engaged by the rollers 80. Stationary pins 84 engage axial grooves 85 in the collar 82 to prevent rotation of the collar with respect to the housing 11. A coil spring 87 encircles the shaft 27 between the collar 82 and the adjustable stop 88 fixed to the shaft 27. From this description it will be understood that turning movement of the shaft 27 causes the rollers 80 to lift the sliding collar 82 against the force of the coil spring 87. As soon as the torque tending to turn the shaft 27 is discontinued, the action of the cam surface 83 on the rollers 80 is to return the rollers and shaft 27 to the initial position, with the spring 87 fully extended.

As best shown in FIGS. 3, 4 and 5, the rounded outer end 73 of the pin 68 travels clockwise in sliding contact with the inner surface 74 of the stationary part 66 as the drive element 65 is turned at slow speed. When the pin 68 approaches the cam nose portion 70, the outer rounded end 73 approaches the surface 77 between recesses 75 and 76. The parts are proportioned so that the pin 68 engages the cam nose portion 70 and the head 73 slides on the surface 77, preventing the pin from moving radially outward, thereby causing the driven element 67 and shaft 27 to turn through a small arc of travel. When the pin head 73 reaches the recess 76, as shown in FIG. 5, the cam nose portion 70 clears the inner end of the pin 68, and returns with the driven element 67 to its initial position under the action of the spring 87 and cam surface 74 of the stationary part 66. Continued rotation of the driving part 65 causes the rounded head 73 of the cam to move out of the recess 76 and to again engage the cylindrical wall portion of the shall 66. The cycle then repeats as the driving part 65 continued to turn, with the result that the shaft 27 is intermittently moved through a small arc of travel and then returned to its initial position.

When well fluid flows downward through the vaned rotor 15, the shaft 16 turns in the reverse direction. The driving part 65 then turns counterclockwise, and the pin 68 engages the other side of the cam nose 70. After the cam nose has been turned through a short arc of travel, the head 73 of the pin 68 moves into the recess 75, to clear the cam nose 70 and permit it to return to its initial position.

The recorder 37 which is of conventional design employs a clockwork motor 35 rotating a threaded screw 91. A nut member 92 cooperating with the screw 91 is permitted to travel axially but is prevented from rotating by means of the key 93. The barrel or chart carrier 34 is fixed with respect to the nut member 92 and carries the removable chart 33 confined in curved position on the inner periphery of the carrier 34. The stylus 32 marks the chart 33 as the latter moves steadily downward, driven by the clockwork motor 35, screw 91 and non-rotary nut 92. The stylus 32 is carried circumferentially through a small arc of travel each time the shaft 27 and stylus carrier 31 receive an impulse from the revolution counter 25. Thus, as shown in FIG. 10, the chart 33 shows a central vertical line 95 produced by downward movement of the chart 33 relative to the stylus 32. Laterally extending marks 96 are produced by the stylus on the chart each time the stylus is moved circumferentially by the revolution counter. The spacing between the laterally extending marks 96 constitutes a measure of the time interval between impulses, and since each impulse corresponds to a predetermined number of revolutions of the vaned rotor 15, the spacing between the lateral marks 96 is approximately inversely proportional to the rate of flow of well fluid. Furthermore, the marks 96 which extend to one side of the line 95 show flow of well fluid in one direction and marks 96 which extend from the other side of the line 95 show passage of well fluid in the other direction. The chart is not examined until after the flow meter device 10 has been withdrawn from the well and disassembled.

In order to minimize entry of well fluid into the lower end of the housing 11, as well as to provide lubricant for the bearings 17 and 18 of the shaft 16, means are provided for introducing a lubricant into the annular space 97 between the rotary shaft member 16 and the housing 11. As best shown in FIG. 2b, shutoff valve plugs 98 and 99 are provided for introducing lubricant through passages 100 and 101, respectively. The plugs are first partially unthreaded so that lubricant may be pumped through the interior of the plugs and into the passages 100 and 101. The plugs are then turned in their respective threaded openings to close against seats 102 and 103, respectively.

In the modified form of the invention shown in FIG. 11, the vaned rotor 15a, magnetic coupling 21a, speed reducer 23a and the recorder 37a are the same as previously described. However, the rotation counter or stepper 25a is somewhat different in construction and operation, as shown in FIG. 12. Furthermore, a second speed reducing device 105 may be interposed between the rotation counter 25a and the recorder 37a. In this modified form of the invention, as shown in FIG. 12, a series of recesses 75a are formed in the stationary member 66a. The recesses are equally spaced. The cam nose portion 70a of the driven element 67 is substantially the same as previously described. The pin 68a travels with the driving part 65a and its rounded end 69a engages the surface of the cam nose 70a. The pin 68a carries the cam nose portion 70a with it until the pin 68a moves radially outward into one of the recesses 75a. The inner end 69a of the pin 68a then clears the cam nose portion 70a. The cam nose portion 70a stops moving while the pin 68a continues turning with the driving part 65a. After the pin 68a has traveled with the driving part 65a for almost a complete revolution, the pin 68a again contacts the cam nose portion 70a and carries it to a new position aligned with the next recess 75a. The cam nose portion 70a is thus moved through a small arc of travel before the pin clears the cam nose to interrupt the drive. As before, the driving parts 65a may turn in the reverse direction when the direction of flow of well fluid through the vaned rotor reverses.

In this form of the invention, the rollers 80, collar 82 and spring 87 are omitted, so that the only substantial frictional force resisting turning movement of the output shaft 27a of the rotation counter or stepper 25a is the frictional resistance of the speed reduction unit 105. The driven element 67 does not return to its initial position after each impulse delivered by the radial pin 68a as the driving part 65a continues to rotate. Accordingly, the driven element 67 moves through a small arc of travel and then remains stationary until the pin 68a again contacts the cam nose portion 70a. The resulting trace 106 on the recorder chart 33a comprises a series of steps, but without the return to the center position following each step. The flow of well fluid past the vaned rotor 15 in one direction produces steps on the chart 33a which are offset in one direction, while flow of well fluid in the other direction produced steps on the chart which are offset in the other direction. As before, the distance between offset steps is roughly inversely proportional to the rate of flow of well fluid.

The greatest sensitivity of the device is achieved when the choke ring 45 is omitted. The choke ring 45 is employed when high flow rates are to be encountered in a well, and the use of this choke ring avoids the necessity of changing the vaned rotor 55 or the speed reducer gearing when high flow rates are to be encountered.

Having fully described my invention, it is to be understood that I am not to be limited to the details herein set forth but that my invention is of the full scope of the appended claims.

I claim:

1. In a flow meter for wells, the combination of: a housing adapted to be lowered into a well, a rotary member mounted to turn relative to the housing about a longitudinal axis of the housing, a vaned rotor fixed to said rotary member and positioned to be contacted and driven by well fluid moving longitudinally in the well, the housing having walls defining a sealed chamber therein, a speed reducer within said sealed chamber, a coupling device connecting said rotary member to drive said speed reducer through one of said chamber walls, a revolution counter within said sealed chamber having an element driven by said speed reducer and having an aligned output element, means whereby the driving element intermittently moves the output element through a small arc of travel, and means within said sealed chamber for recording the intermittent motion of said output element.

2. The combination set forth in claim 1 in which turning movement of the output element of the revolution counter is resisted by cooperative action of a pair of rollers on the output element engaging the surface of a cam, the cam encircling the output element, cooperating means on the housing and cam permitting axial movement but preventing rotational movement of the cam, and resilient means urging the cam into contact with said rollers.

3. In a flow meter for wells, the combination of: a housing adapted to be lowered into a well on a wire line, a rotary member mounted to turn relative to the housing about a longitudinal axis of the housing, a vaned rotor fixed to said rotary member and positioned to be contacted and driven by a well fluid moving longitudinally in the well, a guard encircling said rotor and provided with a ported nose piece, and apertured connection means fixing said guard to said housing, said apertured connection means comprising a series of circumferentially spaced cylindrical rods.

4. In a flow meter for wells, the combination of: a housing adapted to be lowered into the well on a wire line, a rotary member mounted to turn relative to the housing about a longitudinal axis of the housing, a vaned rotor fixed to said rotary member and positioned to be contacted and driven by well fluid moving longitudinally in the well, a revolution counter carried by said housing, said revolution counter including an outer stationary shell and an inner driven rotary element defining an annular space between them, a driving part mounted to rotate in said annular space and connected to said rotary member, a pin slidably mounted on said driving part for movement toward and away from said axis, said shell having an inner wall surface provided with an internal recess, said driven element having a cam provided with a nose portion adapted to be contacted by an inner portion of said pin, the outer portion of said pin contacting said wall surface and moving into said recess to permit the inner portion of the pin to clear said nose portion of said cam, whereby each revolution of said driving member causes the pin to move the cam and driven element through a small arc of travel.

5. The combination set forth in claim 4 in which the pin is mounted for radial movement on the driving part and is provided with an enlarged head having a rounded end surface for contact with said wall surface and internal recess.

6. The combination set forth in claim 4 in which the inner wall surface of said shell is provided with a series of equally spaced internal recesses.

7. In a flow meter for wells, the combination of: a tubular housing adapted to be lowered into a well on a wire line, a rotary member mounted to turn within the housing about a longitudinal axis of the housing, a vaned rotor fixed to said rotary member and positioned to be contacted and driven by well fluid moving longitudinally in the well, the housing having walls defining a sealed chamber therein, a speed reducer within said sealed chamber, a revolution counter within said sealed chamber driven by said speed reducer, means within said sealed chamber for recording the output of the revolution counter, and a magnetic coupling device connecting said rotary member to drive said speed reducer through one of said chamber walls, the wall being formed of nonmagnetic material in the shape of a hollow hemisphere projecting into the sealed chamber, said coupling device including a concave magnet fixed to the rotary member and projecting into the hollow hemisphere, said device also including a convex magnet connected to the speed reducer and surrounding the hollow hemisphere.

* * * * *